Dec. 3, 1940.  J. C. WEAVER  2,223,502
AUTOMOBILE SPEED GOVERNOR
Original Filed March 28, 1938   2 Sheets-Sheet 1
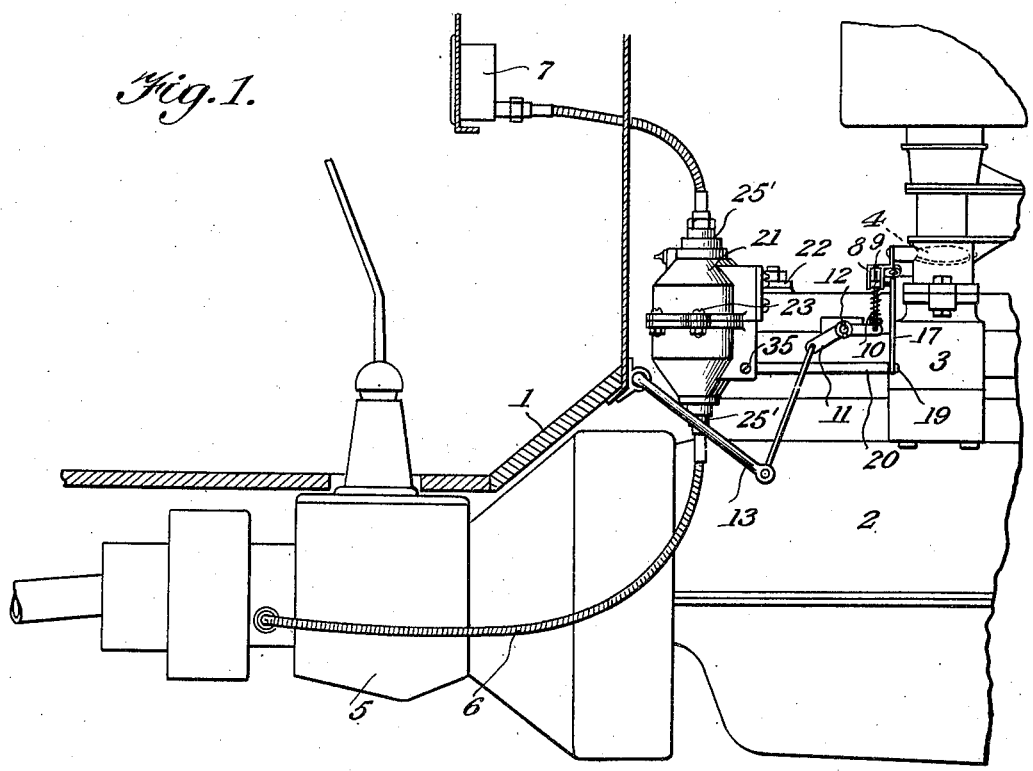
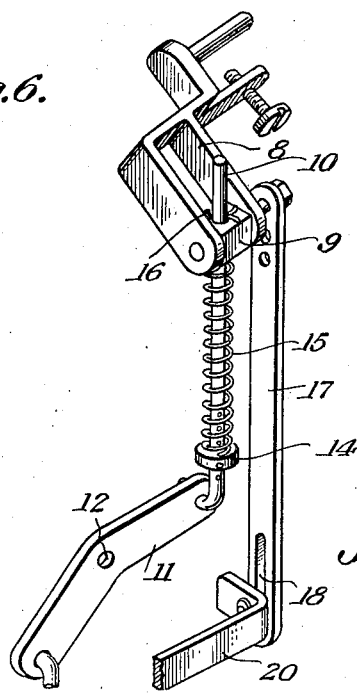
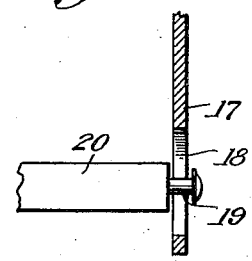
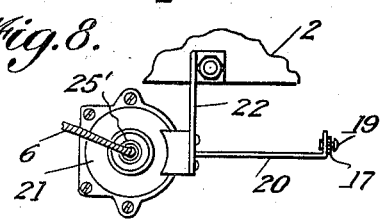
James C. Weaver
INVENTOR
BY Victor J. Evans & Co.
ATTORNEYS

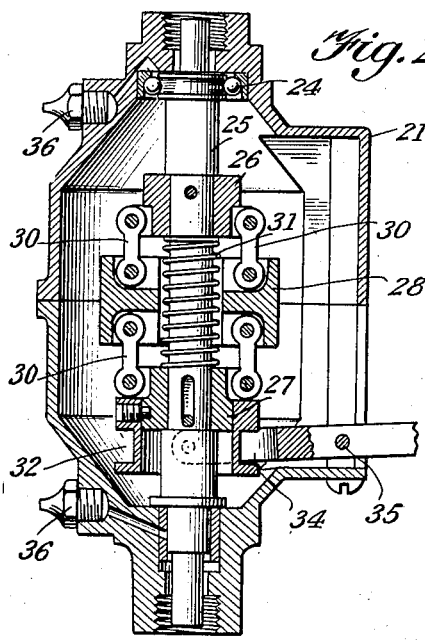
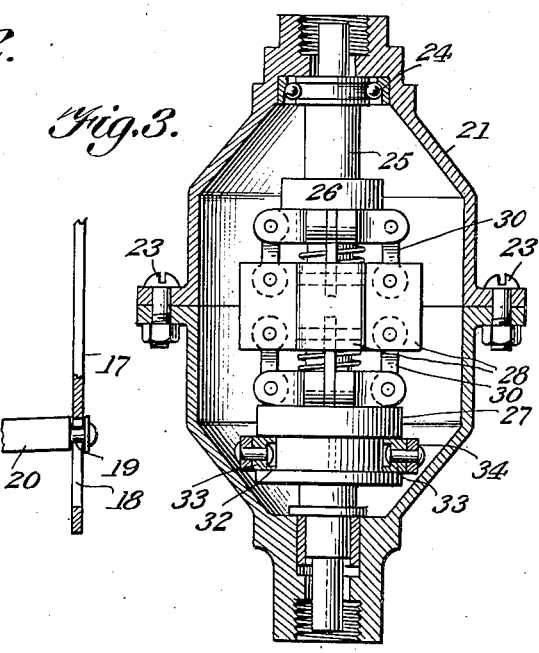
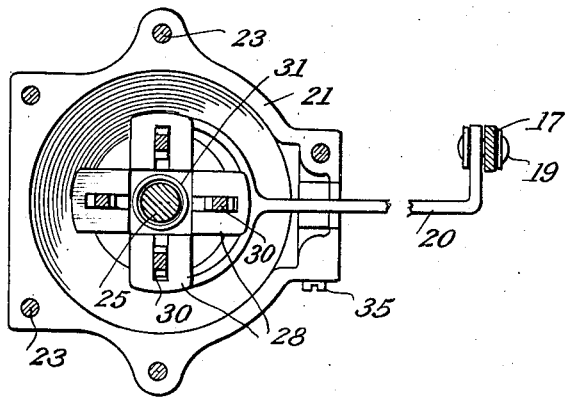
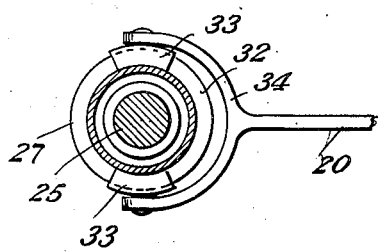

Patented Dec. 3, 1940

2,223,502

UNITED STATES PATENT OFFICE 2,223,502

AUTOMOBILE SPEED GOVERNOR

James C. Weaver, Harrisburg, Pa., assignor, by direct and mesne assignments, of twenty-five per cent to Amelia C. Berneker, fifteen per cent to Clare E. Hartman and five per cent to R. J. Howell, all of Harrisburg, Pa., and fifty-five per cent to Weaver Automotive Corporation, a corporation of Delaware Application March 28, 1938, Serial No. 198,613
Renewed March 31, 1939

2 Claims. (Cl. 180—82.1)

This invention relates to governors especially adapted for motor vehicles and has for the primary object the provision of an efficient and compact device of this character which may be readily installed on a motor vehicle to automatically prevent the speed of the vehicle by the propulsion of its engine from exceeding a predetermined speed and which will permit driving of said vehicle at any speed between zero and said predetermined speed and is so constructed that it may be readily coupled in the speedometer drive shaft of the vehicle and easily connected with the throttle of the engine.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation, partly in section, showing a governor adapted to a portion of a motor vehicle and constructed in accordance with my invention.

Figure 2 is a vertical sectional view illustrating a governor unit.

Figure 3 is a sectional view taken at right angles to Figure 2 showing the governor unit.

Figure 4 is a horizontal sectional view showing the governor unit.

Figure 5 is a detail sectional view showing the connection between an operating arm and the slidable sleeve of the governor element.

Figure 6 is a perspective view showing a linkage employed between the carbureter throttle of the engine of the vehicle and the governor unit as well as showing the connection of the accelerator with the throttle of the carbureter.

Figure 7 is a fragmentary sectional view showing the slidable connection between the governor arm and the link connected to the carbureter throttle.

Figure 8 is a fragmentary top plan view showing the mounting of the governor unit on the engine of the vehicle.

Referring in detail to the drawings, the numeral 1 indicates a fragmentary portion of a motor vehicle wherein the engine is indicated by the character 2 and the carbureter thereof by the character 3. The carbureter has the usual throttle valve 4. The transmission of the vehicle is indicated by the character 5 and has connected thereto the usual speedometer shaft 6 which is continuously driven during the travel of the vehicle. The speedometer is indicated by the character 7. The speedometer shaft 6 is sectional in this instance so that the present invention may be coupled therein.

The shaft of the throttle valve 4 has secured thereto a bifurcated arm 8 and pivoted thereto is a block 9 slidably receiving a rod 10, one end of which is pivotally connected to one end of a lever 11. The lever 11 is pivotally mounted on the engine 2, as shown at 12, and has connected to its other end the usual accelerator mechanism 13. A collar 14 is mounted on the rod 10 adjacent the lever 11 and interposed between said collar and the block 9 is a coil spring 15 providing a yieldable drive connection between the lever 11 and the block 9. A cotter pin 16 passes through the rod 10 to prevent said rod from being entirely withdrawn from the block 9.

A bar 17 has one end pivotally and adjustably connected to the bifurcated arm 8 and is provided in its opposite end with a slot 18 to receive a pin 19 of a governor arm 20. The slot and pin provide a pivotal and slidable connection between the bar and the governor arm which will permit the bar to have a limited movement relative to the governor arm.

Upon movement of the mechanism 13 to accelerate the speed of the engine, the rod 10 will be moved upwardly through the medium of the lever 11 and cause the spring 15 to effect upward movement of the block 9 and arm 8 to open the throttle valve 4 in the usual manner. Upward movement of the block 9 serves to move the bar 17 upwardly at the same time and effect upward movement of the lower end of said bar 17 relative to the arm 20 through the medium of the pin 19 sliding within the slot 18 of said bar 17. Obviously, downward movement of the arm 20, by a governor hereinafter more fully described, serves to rest or limit the upward movement of the bar 17 through the medium of the pin 19 engaging the lower end wall of the slot 18 and thus checking further acceleration of said engine.

A governor housing 21 of sectional formation is mounted on the engine 2 by a bracket 22. The sections of the housing 21 are detachably connected by bolts 23. The opposite ends of the housing are reduced and provide journals 24 of the anti-friction type to rotatably support a governor shaft 25. The ends of the governor shaft are so constructed that they may be coupled with the sections of the speedometer shaft 6, the latter including the usual flexible housing equipped with fittings 25' to be threaded in the ends of the housing 21. Governor collars 26 and 27 are located on the governor shaft 25, the governor collar 26 being fixed on said governor shaft while the governor collar 27 is mounted thereon to have a limited sliding movement. Governor weights 28 are pivotally connected with the governor collars 26 and 27 by links 30 whereby the weights may swing outwardly of the governor shaft under centrifugal action. A coil spring 31 is located on the governor shaft between the governor collars and acts in opposition to the weights under centrifugal action or, in other words, acts to move the weights in the direction of the governor shaft. The governor collar 27 has an annular groove 32 to receive blocks 33 pivoted on a forked end 34 of the governor arm 20, the latter extending through a slot in the housing 21 and is pivotally mounted on said housing, as shown at 35. Suitable lubricating fittings 36 are provided on the housing 21 for the purpose of admitting lubricant to the anti-friction journals 24.

In operation, the vehicle under the propulsion of the engine may be driven at any speed from zero to a predetermined speed in the usual manner through the actuation of the accelerator mechanism. However, when the speed of the vehicle exceeds the predetermined speed the governor acts and automatically closes the throttle valve of the engine thereby preventing driving of the vehicle faster than a predetermined or selected speed. The device described and shown in the drawings is compact, economical to construct, durable and may be readily adapted to any motor vehicle now in use.

What is claimed is:

1. In combination with a motor vehicle having a speedometer shaft and an engine having a carbureter provided with a throttle valve, a forked arm secured to said throttle valve, a lever pivoted on said engine and connected to an accelerator mechanism, a yieldable drive connection between the lever and the forked arm, a bar pivotally and adjustably connected to the forked arm, a governor mechanism mounted on the engine and connected to the speedometer shaft to be actuated thereby and including a governor arm pivotally and slidably connected to said bar.

2. In combination with a motor vehicle having a speedometer shaft and an engine having a carbureter provided with a throttle valve, an arm fixed to said throttle valve, a lever pivoted on said engine and connected to an accelerator mechanism, a yieldable drive connection between said lever and said arm, a bar adjustably connected to said arm, a governor mechanism mounted on the engine and operated by said speedometer shaft, and means slidably connecting said governor mechanism to said bar.

JAMES C. WEAVER.